US012108202B2

(12) United States Patent
Obase et al.

(10) Patent No.: US 12,108,202 B2
(45) Date of Patent: Oct. 1, 2024

(54) SPEAKER UNIT AND EARPHONE

(71) Applicant: Panasonic Intellectual Property Management Co., Ltd., Osaka (JP)

(72) Inventors: Satoshi Obase, Osaka (JP); Koichi Muramatsu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 222 days.

(21) Appl. No.: 17/543,103

(22) Filed: Dec. 6, 2021

(65) Prior Publication Data

US 2022/0182746 A1 Jun. 9, 2022

(30) Foreign Application Priority Data

Dec. 9, 2020 (JP) ................................ 2020-204311

(51) Int. Cl.
*H04R 1/10* (2006.01)
*H04R 7/00* (2006.01)
*H04R 9/02* (2006.01)

(52) U.S. Cl.
CPC ............. *H04R 1/1016* (2013.01); *H04R 7/00* (2013.01); *H04R 9/02* (2013.01); *H04R 2400/11* (2013.01)

(58) Field of Classification Search
CPC .......... H04R 1/1016; H04R 7/00; H04R 9/02; H04R 2400/11; H04R 1/06; H04R 1/1058; H04R 25/60
See application file for complete search history.

(56) References Cited

U.S. PATENT DOCUMENTS

| | | | | |
|---|---|---|---|---|
| 2001/0017930 | A1* | 8/2001 | Matsudo | H04R 11/00 381/430 |
| 2003/0194105 | A1* | 10/2003 | Kuwabara | H04R 1/06 381/409 |
| 2020/0366996 | A1* | 11/2020 | Kosuda | H04M 1/6058 |
| 2021/0136477 | A1* | 5/2021 | Ozawa | H04R 19/016 |

FOREIGN PATENT DOCUMENTS

| | | | | | |
|---|---|---|---|---|---|
| CN | 105704615 | | | 6/2016 | |
| CN | 105704615 | A | * | 6/2016 | H04R 1/10 |
| JP | 2008-283398 | | | 11/2008 | |
| JP | 2008278146 | A | * | 11/2008 | |
| JP | 2011119913 | A | * | 6/2011 | H04R 1/10 |
| JP | 2015-109542 | | | 6/2015 | |
| KR | 101423570 | B1 | * | 7/2014 | H04R 1/10 |
| WO | WO-2019069568 | A1 | * | 4/2019 | H04M 1/00 |
| WO | 2020/218042 | | | 10/2020 | |
| WO | WO-2020218042 | A1 | * | 10/2020 | H04R 9/02 |

OTHER PUBLICATIONS

Extended European Search Report issued in European Patent Application No. 21212806.0, dated May 18, 2022.

* cited by examiner

*Primary Examiner* — Angelica M McKinney
(74) *Attorney, Agent, or Firm* — Greenblum & Bernstein, P.L.C.

(57) ABSTRACT

A speaker unit incorporated in a housing of an earphone includes: a frame having a cylindrical shape; a diaphragm emitting sound; and a board to which a wiring line of a coil provided to the diaphragm is connected. The frame has a space inside, and the diaphragm and the board are placed inside the frame with the space interposed between the diaphragm and the board.

10 Claims, 10 Drawing Sheets

SPEAKER UNIT AND EARPHONE

CROSS REFERENCE TO RELATED APPLICATIONS

This application is entitled to and claims the benefit of Japanese Patent Application No. 2020-204311, filed on Dec. 9, 2020, the disclosure of which including the specification, drawings and abstract is incorporated herein by reference in its entirety.

TECHNICAL FIELD

The present disclosure relates to a speaker unit and an earphone.

BACKGROUND ART

Patent Literature 1 (hereinafter, referred to as "PTL" 1) discloses an earphone which arrows removal and/or replacement of a part of a housing. The earphone of PTL 1 enables adjustment of sound quality by removal and/or replacement of the part of the housing to change a space volume in the housing.

CITATION LIST

Patent Literature

PTL 1
Japanese Patent Application Laid-Open No. 2008-283398

SUMMARY OF INVENTION

Technical Problem

However, when a board and a wiring line are placed in the space for adjusting sound quality and the volume of the space varies depending on the amount of solder on the board or deflection of the wiring line, there arises a problem in that the sound quality varies in individual earphones.

One non-limiting and exemplary embodiment of the present disclosure facilitates providing a speaker unit and an earphone that can reduce variations in sound quality.

Solution to Problem

One embodiment of the present disclosure is a speaker unit incorporated in a housing of an earphone, the speaker unit including: a frame having a cylindrical shape a diaphragm emitting sound; and a board to which a wiring line of a coil provided to the diaphragm is connected, in which the frame has a space inside, and the diaphragm and the board are placed inside the frame with the space interposed between the diaphragm and the board.

One embodiment of the present disclosure is an earphone including a housing and a speaker unit incorporated in the housing, in which the speaker unit includes: a frame having a cylindrical shape; a diaphragm emitting sound; and a board to which a wiring line of a coil provided to the diaphragm is connected, in which the frame has a space inside, and the diaphragm and the board are placed inside the frame with the space interposed between the diaphragm and the board.

Note that these general or specific aspects may be achieved by a system, an apparatus, a method, an integrated circuit, a computer program, or a recording medium, and also by any combination of the system, the apparatus, the method, the integrated circuit, the computer program, and the recording medium.

Advantageous Effects of Invention

According to one embodiment of the present disclosure, it is possible to reduce variations in sound quality of a speaker unit and an earphone.

Additional benefits and advantages of one embodiment of the present disclosure will become apparent from the specification and drawings. The benefits and/or advantages may be individually obtained by some embodiments and features described in the specification and drawings, which need not all be provided in order to obtain one or more of such features.

DESCRIPTION OF EMBODIMENTS

Hereinafter, embodiments of the present invention will be described in detail with reference to the drawings as appropriate. However, a detailed description more than necessary may be omitted, such as a detailed description of a well-known matter and a duplicate description for a substantially identical configuration, to avoid unnecessary redundancy of the following description and to facilitate understanding by a person skilled in the art.

Note that, the accompanying drawings and the following description are provided for the person skilled in the art to sufficiently understand the present disclosure, and are not intended to limit the subject matter described in the claims.

Embodiment 1

Figure 1:
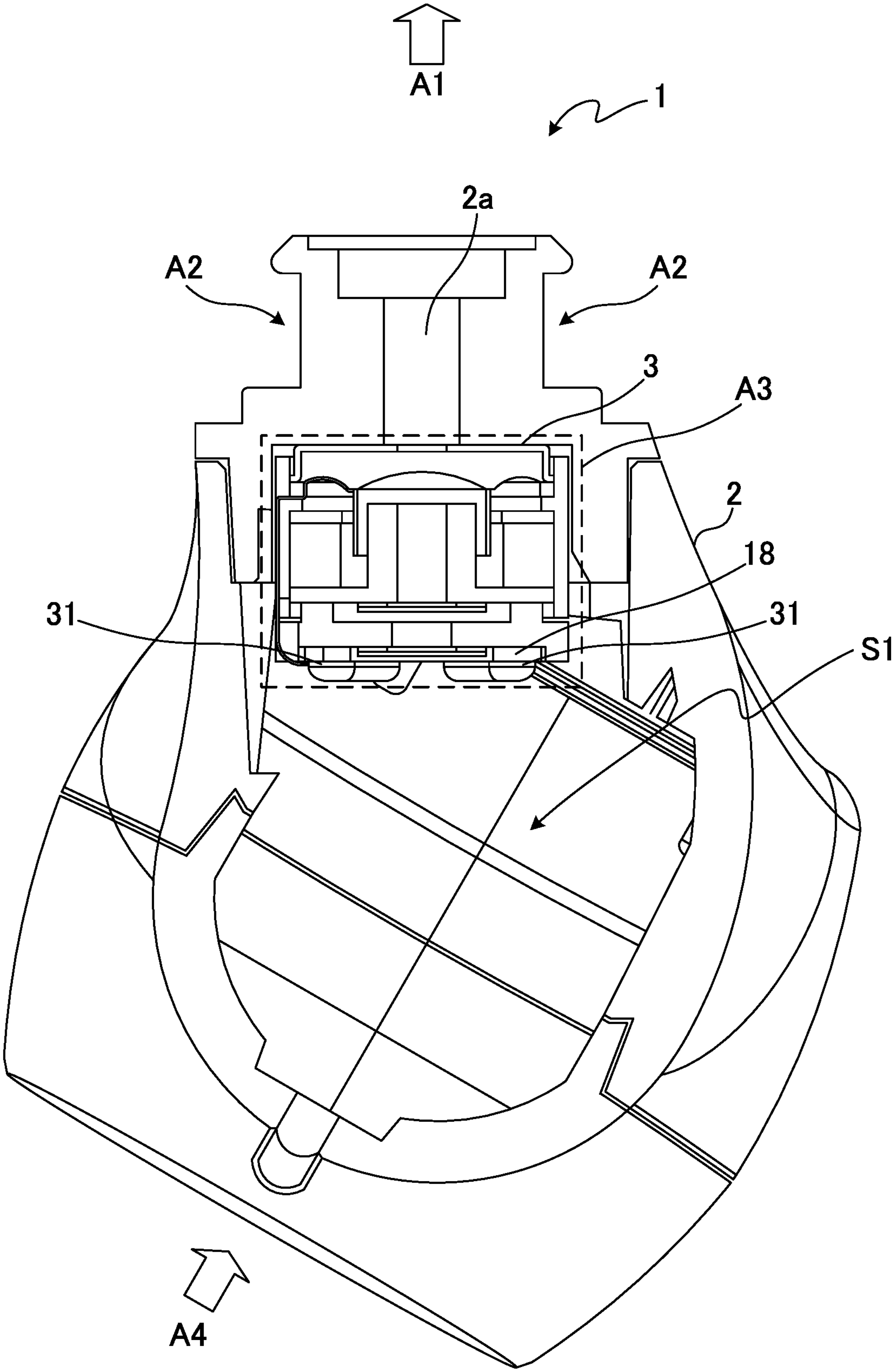
FIG. 1 is a partial cross-sectional view of an earphone provided with a speaker unit according to Embodiment 1.

FIG. 1 is a partial cross-sectional view of earphone 1 provided with speaker unit 3 according to Embodiment 1. As shown in FIG. 1, earphone 1 includes housing 2 and speaker unit 3.

Arrow A1 in FIG. 1 indicates the insertion direction of earphone 1 into the ear. An eartip (not shown) is fitted to the recessed part of housing 2 shown by arrow A2 in FIG. 1.

Speaker unit 3 is a device that emits sound. Speaker unit 3 is incorporated in housing 2. The portion surrounded by the dotted frame A3 in FIG. 1 is speaker unit 3. Speaker unit 3 has a cylindrical shape (see FIG. 2). Speaker unit 3 may be referred to as a driver.

Housing 2 has sound conduit 2*a*. Sound emitted from speaker unit 3 is transmitted through sound conduit 2*a* and released to the eartip.

Figure 3:
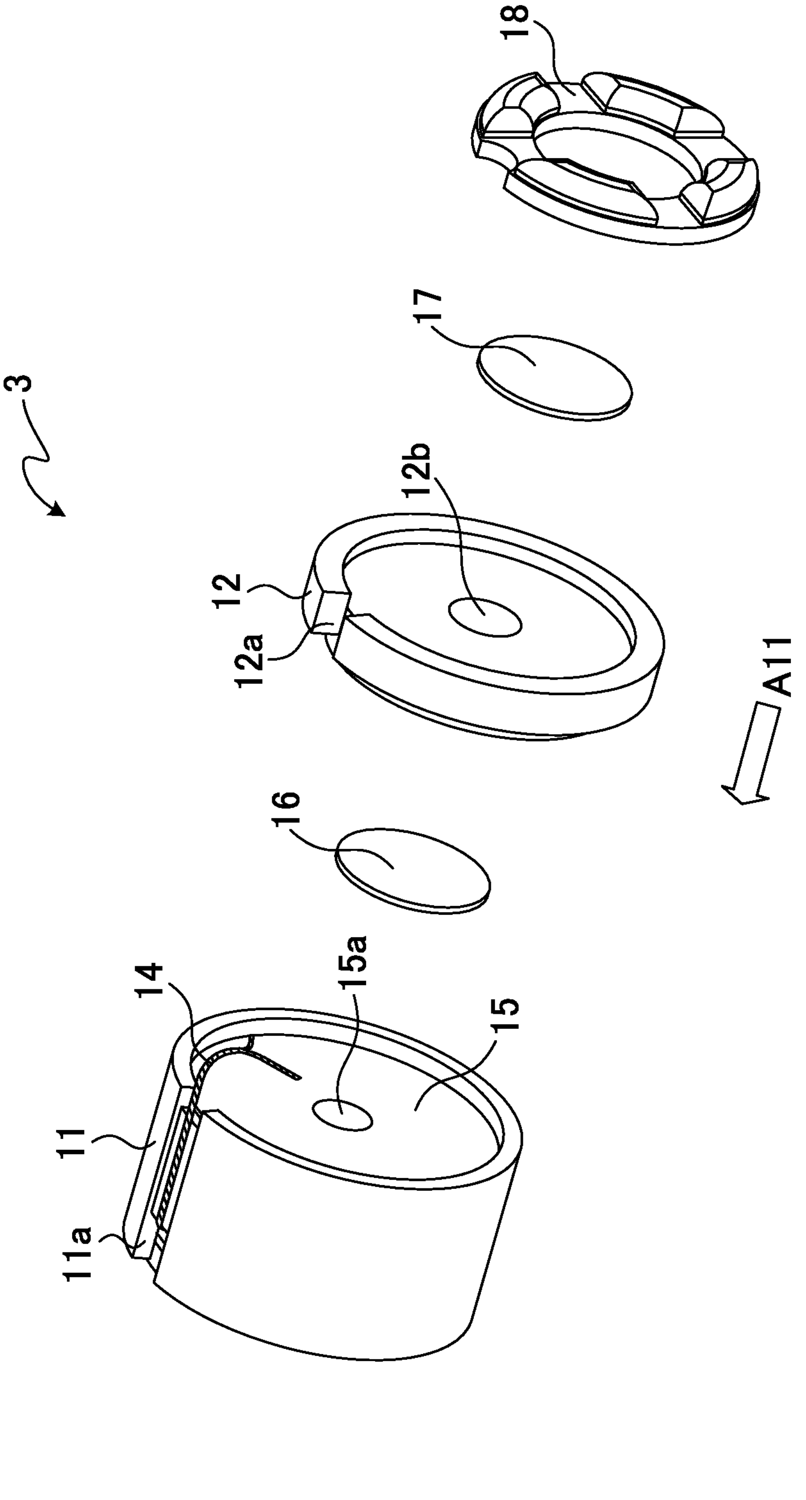
FIG. 3 is a rear exploded perspective view of the speaker unit.
Figure 5:
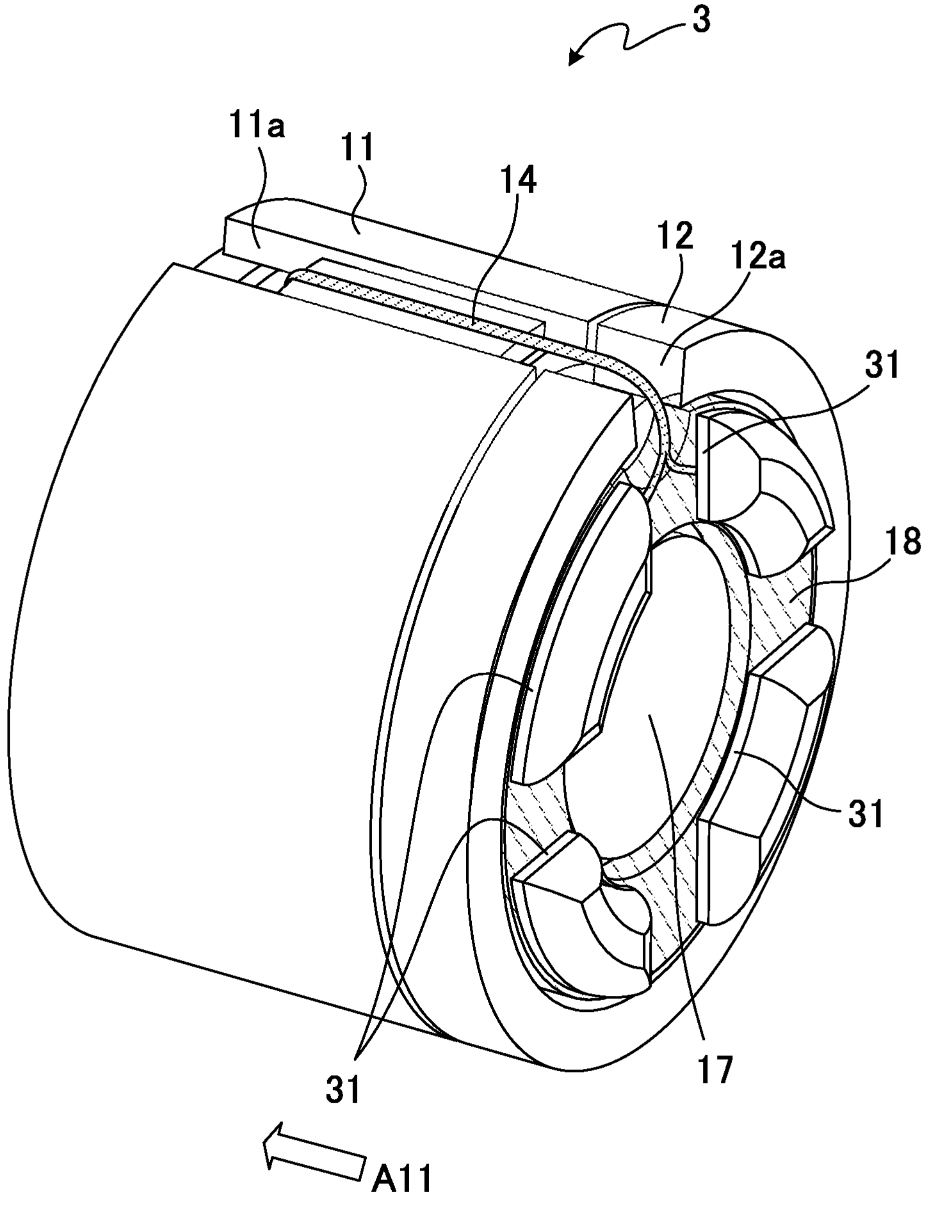
FIG. 5 is a rear perspective view of the speaker unit.

Speaker unit 3 includes, for example, board 18 for inputting an audio signal from an electronic device such as a music reproduction device or a hearing aid (see board 18 in FIGS. 3 and 5). Board 18 has land 31 (see land 31 in FIG. 5). A wiring line (not shown) is connected to land 31 by soldering. In space S1 formed in housing 2, the wiring line is connected to an electronic board for wireless transmission (not shown) placed in space S1, and the electric board is connected wirelessly to the above-mentioned electronic device.

The wiring line may be drawn to the outside of earphone 1 from the part of earphone 1 shown by arrow A4 in FIG. 1 through space S1 formed in housing 2, for example. The wiring line drawn to the outside of earphone 1 is connected to the above-mentioned electronic device.

Figure 2:
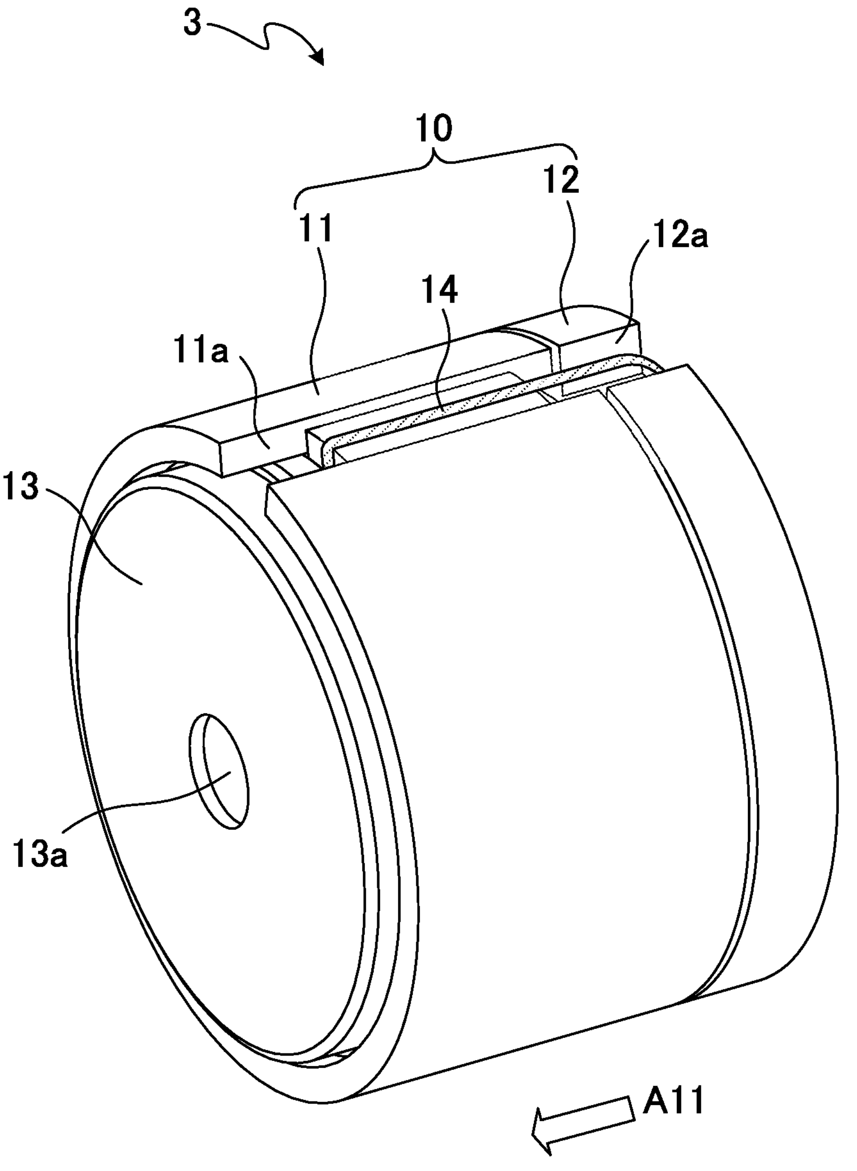
FIG. 2 is a front perspective view of the speaker unit.

FIG. 2 is a front perspective view of the speaker unit. In FIG. 2, the same components as those in FIG. 1 are denoted by the same reference numerals. As shown in FIG. 2, speaker unit 3 includes frame 10, cover 13, and wiring line 14. The direction indicated by arrow A11 in FIG. 2 is the front direction of speaker unit 3, i.e., the sound conduit 2*a* side of earphone 1.

Frame 10 is divided into frames 11 and 12 (see FIG. 3). Frames 11 and 12 have cylindrical shapes. Cover 13 is placed in front of frame 11. Hole 13*a* is formed in the center of cover 13. Hole 13*a* of cover 13 communicates with sound conduit 2*a* of earphone 1.

Inside frame 11, a diaphragm to be described later is placed. The sound emitted from the diaphragm is output from hole 13*a* of cover 13. The sound emitted from hole 13*a* is released to sound conduit 2*a*.

Frames 11 and 12 have linear cutout portions 11*a* and 12*a* on the circumferential surfaces. Wiring line 14 is arranged in cutout portion 11*a* of frame 11 and cutout portion 12*a* of frame 12.

FIG. 3 is a rear exploded perspective view of speaker unit 3. In FIG. 3, the same components as those in FIGS. 1 and 2 are denoted by the same reference numerals. As shown in FIG. 3, speaker unit 3 includes yoke 15, resistance members 16 and 17, and board 18.

Yoke 15 is accommodated inside frame 11. Yoke 15 has a protruding shape (see yoke 15 in FIGS. 4, 6 and 7). Yoke 15 is made of a magnetic material.

York 15 has hole 15*a* at the center thereof. Hole 15*a* communicates with the diaphragm to be described later, which transmits air (sound) vibrated by the diaphragm.

Resistance members 16 and 17 are mesh-shaped or porous plate-shaped members. Resistance members 16 and 17 may be made of a nonwoven fabric of a chemical fiber. Resistance members 16 and 17 brake (suppress) the vibration of sound output from hole 15*a*.

Resistance member 16 is bonded with yoke 15 to close hole 15*a*. Resistance member 16 may be bonded with yoke 15 by a double-sided tape.

Frame 12 has hole 12*b* at the center thereof. Hole 12*b* communicates with resistance member 16. The sound passing through hole 15*a* of yoke 15 and resistance member 16 is transmitted to hole 12*b*.

Resistance member 17 is bonded to the surface of the rear side of frame 12 (the side opposite to arrow A11) to close hole 12*b*. Resistance member 17 may be bonded with frame 12 by a double-sided tape, for example.

Board 18 has a hole at the center thereof. The diameter of the hole of board 18 is larger than the diameter of resistance member 17. Board 18 is bonded to frame 12 so as not to overlap with resistance member 17. That is, board 18 is bonded with frame 12 so that resistance member 17 is accommodated within the hole of board 18. Board 18 may be bonded with frame 12 by a double-sided tape or an adhesive.

The end of wiring line 14 extending from frame 11 is soldered to land 31 of board 18 (see land 31 in FIG. 5).

Figure 4:
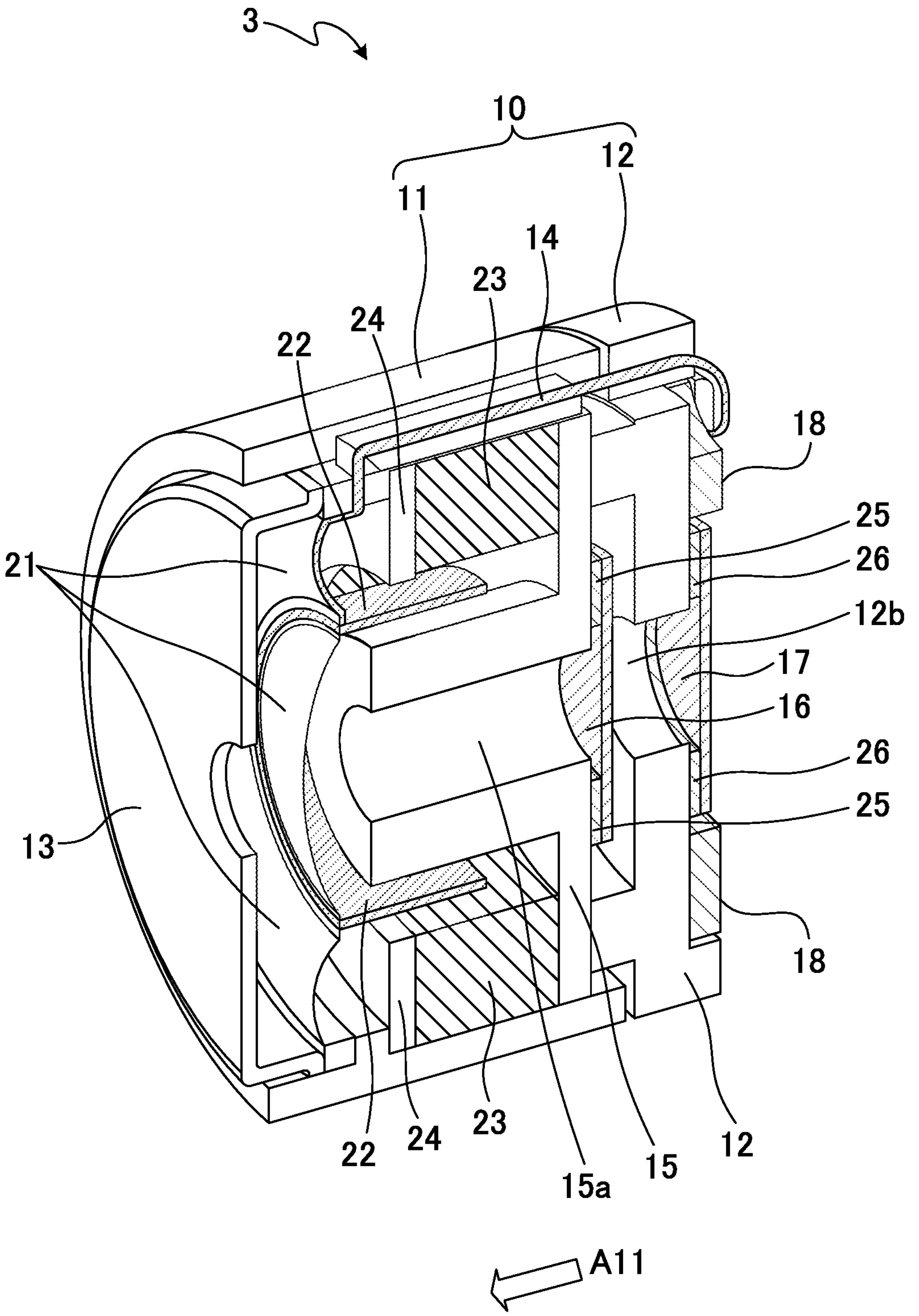
FIG. 4 is a front perspective cross-sectional view of the speaker unit.

FIG. 4 is a front perspective cross-sectional view of speaker unit 3. In FIG. 4, the same components as those in FIGS. 1 to 3 are denoted by the same reference numerals. As shown in FIG. 4, speaker unit 3 includes diaphragm 21, coil 22, magnet 23, pole piece 24, and adhesive members 25 and 26.

Diaphragm 21 has a circular shape and the edge thereof is fixed inside frame 11. Diaphragm 21 is placed between cover 13 and pole piece 24.

Coil 22 has a cylindrical shape. Coil 22 is fixed to the surface of the rear side of diaphragm 21 (the side opposite to arrow A11). Coil 22 is placed so as to surround the outer peripheral surface of the narrowed portion of yoke 15 having a protruding shape.

Wiring line 14 is drawn from coil 22. Wiring line 14 drawn from coil 22 passes through diaphragm 21, cutout portion 11*a* of frame 11 (see FIG. 2), and cutout portion 12*a* of frame 12 (see FIG. 2). Wiring line 14 is then drawn to the rear side of speaker unit 3 to be soldered to land 31 of board 18 (see land 31 in FIG. 5).

Magnet 23 has a cylindrical shape. The inner diameter of magnet 23 is larger than the outer diameter of coil 22, and magnet 23 is placed so as to surround the outer peripheral surface of coil 22. Thus, coil 22 is placed between the inside of magnet 23 and the outside of the narrowed portion of yoke 15.

Pole piece 24 is a circular and plate-shaped member and has a hole at the center thereof. Coil 22 and the narrowed portion of york 15 pass through the hole of pole piece 24. Pole piece 24 is made of a magnetic material.

The diameter of the hole of pole piece 24 is larger than the outer diameter of coil 22. The hole is placed so as to surround the outer peripheral surface of coil 22. Further, pole piece 24 is placed between diaphragm 21 and magnet 23.

Adhesive member 25 has a circular shape and has a hole at the center thereof. The hole of adhesive member 25 is larger than the diameter of hole 15*a* of yoke 15. Adhesive member 25 is bonded to yoke 15 so as not to block hole 15*a* of yoke 15. Adhesive member 25 is a double-sided tape, for example. Adhesive member 25 attaches resistance member 16 to yoke 15.

Adhesive member 26 has a circular shape and has a hole at the center thereof. The hole of adhesive member 26 is larger than the diameter of hole 12*b* of frame 12. Adhesive member 26 is bonded with frame 12 so as not to block hole 12*b* of frame 12. Adhesive member 26 is a double-sided tape, for example. Adhesive member 26 attaches resistance member 17 to frame 12.

Figure 6:
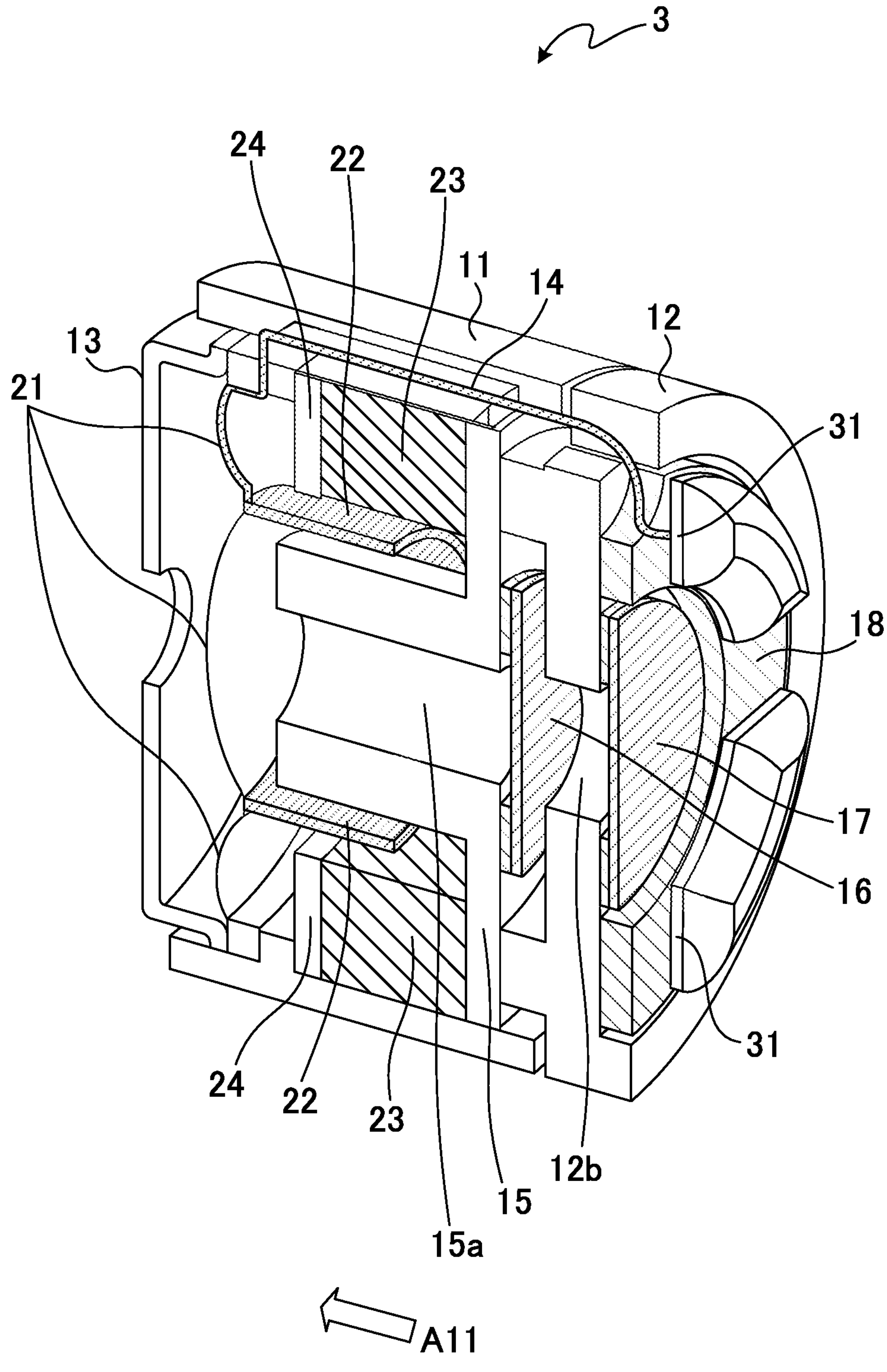
FIG. 6 is a rear perspective cross-sectional view of the speaker unit.

FIG. 5 is a rear perspective view of speaker unit 3. FIG. 6 is a rear perspective cross-sectional view of speaker unit 3. In FIGS. 5 and 6, the same components as those in FIGS. 1 to 4 are denoted by the same reference numerals.

Board 18 has four lands 31, for example. Two wiring lines 14, which are drawn from coil 22 passing through diaphragm 21, cutout portion 11*a* of frame 11, and cutout portion 12*a* of frame 12, are soldered to two lands 31 of the four lands 31.

The wiring line passing through space S1 of housing 2 described in FIG. 1 is connected to the remaining two lands 31. The number of lands is not limited to four.

Figure 7:
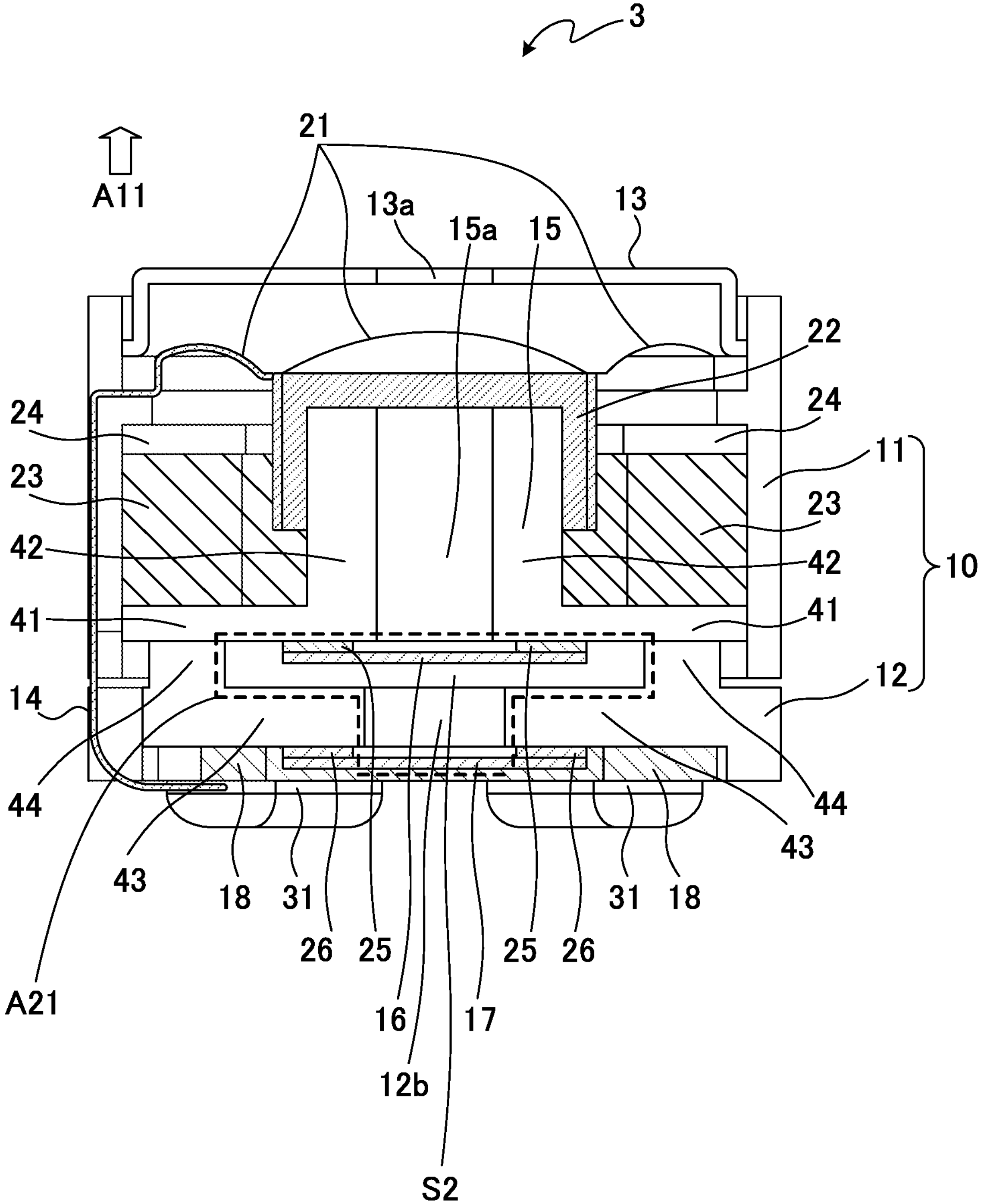
FIG. 7 is a cross-sectional view of the speaker unit.

FIG. 7 is a cross-sectional view of speaker unit 3. In FIG. 7, the same components as those in FIGS. 1 to 6 are denoted by the same reference numerals.

As shown in FIG. 7 (see also FIGS. 4 and 6), yoke 15 has a protruding shape. York 15, as shown in FIG. 7, includes bottom 41 which has a disc shape forming the bottom of the convex shape, and side portion 42 which has a cylindrical shape and extends from bottom 41 toward the front side (the direction of diaphragm 21) of speaker unit 3. Bottom 41 and side portion 42 have hole 15*a* at the center thereof.

As shown in FIG. 7 (see also FIGS. 4 and 6), frame 12 has a concave shape. Frame 12, as shown in FIG. 7, includes bottom 41 which has a disc shape forming the bottom of the concave shape and side portion 42 which has a cylindrical shape and extends from bottom 41 toward the front side (the direction of diaphragm 21) of speaker unit 3. Bottom 43 has hole 12*b* at the center thereof.

The upper end (the end portion on the side of diaphragm 21) of side portion 42 of frame 12 having a recess shape is bonded to bottom 41 of yoke 15 having a protruding shape. This forms space S2 inside frames 11 and 12 in speaker unit 3 (e.g., see dotted frame A21 in FIG. 7).

Space S2 communicates with diaphragm 21 through resistance member 16 and hole 15*a* of york 15. Further, space S2 communicates with the outside of speaker unit 3 through resistance member 17. The volume of space S2 and the characteristics (e.g., how well air or sound passes therethrough) of resistance members 16 and 17 control, for example, the frequency characteristic of the sound pressure that determines the sound quality of the sound emitted from diaphragm 21.

In a case where board 18 and wiring line 14 are placed in space S2, sound quality varies in individual speaker units 3 in some cases. For example, the volume of space S2 would change due to the amount of solder on board 18, deflection of wiring line 14 in space S2, or the amount of the adhesive sealing the hole for drawing wiring line 14 from space S2 to the outside of space S2. Therefore, sound quality varies in individual speaker units 3 when board 18 and wiring line 14 are placed in space S2.

In contrast, in speaker unit 3 of the present embodiment, diaphragm 21 and board 18 are placed with space S2 interposed therebetween along the central axis of frames 11 and 12 having cylindrical shapes; therefore, board 18 is not placed inside space S2 in speaker unit 3. Wiring line 18 connecting coil 22 with board 18 can also be placed outside space S2. Thus, speaker unit 3 and earphone 1 incorporating speaker unit 3 can reduce variations in sound quality.

As described above, speaker unit 3 incorporated in the housing of earphone 1 includes frame 10 having a cylindrical shape, diaphragm 21 emitting sound, and board 18 to which a wiring line of coil 22 provided to diaphragm 21 is connected. Space S2 for adjusting sound quality of sound is formed inside frame 10, and diaphragm 21 and board 18 are placed inside frame 10 with space S2 interposed between diaphragm 21 and board 18.

Thus, individual speaker units 3 can have a constant volume of space S2 for adjusting sound quality and can reduce variations of sound quality. Earphone 1 incorporating speaker unit 3 can also reduce variations of sound quality.

Further, frames 12 and 11 of frame 10 are parts of separate members (separate units). The speaker unit having no space S2 can be easily changed to speaker unit 3 having space S2.

For example, apart from speaker unit 3 shown in FIG. 7, a speaker unit in which board 18 is fixed to bottom 41 of yoke 15 (hereinafter, referred to as an "existing speaker unit") is present. In this case, frame 12 is fixed to bottom 41 of yoke 15 of the existing speaker unit. Then, board 18 is fixed to frame 12 fixed to bottom 41. This makes it possible to easily change the existing speaker to speaker unit 3 having space S2.

Note that bottom 41 of yoke 15 and bottom 43 of frame 12 are partitions to form space S2 inside frame 10. Bottom 41 of yoke 15 may be referred to as a first partition. Bottom 43 of frame 12 may be referred to as a second partition.

(Variation 1)

Resistance member 17 is bonded to the surface of frame 12 on the rear side of speaker unit 3, but not limited to the above. Resistance member 17 may be bonded to the surface of the frame 12 on the front side of speaker unit 3.

(Variation 2)

The shapes and arrangements of yoke 15 and magnet 23 are not limited to the above. For example, a cylindrical magnet may be placed inside coil 22, and a recess yoke surrounding coil 22 may be placed outside coil 22.

Embodiment 2

According to Embodiment 1, frames 11 and 12 of frame 10 are separate members but may be a single unit member. When frames 11 and 12 are formed as a single unit member, the number of parts for the speaker unit can be reduced, which leads to a cost reduction.

Figure 8:
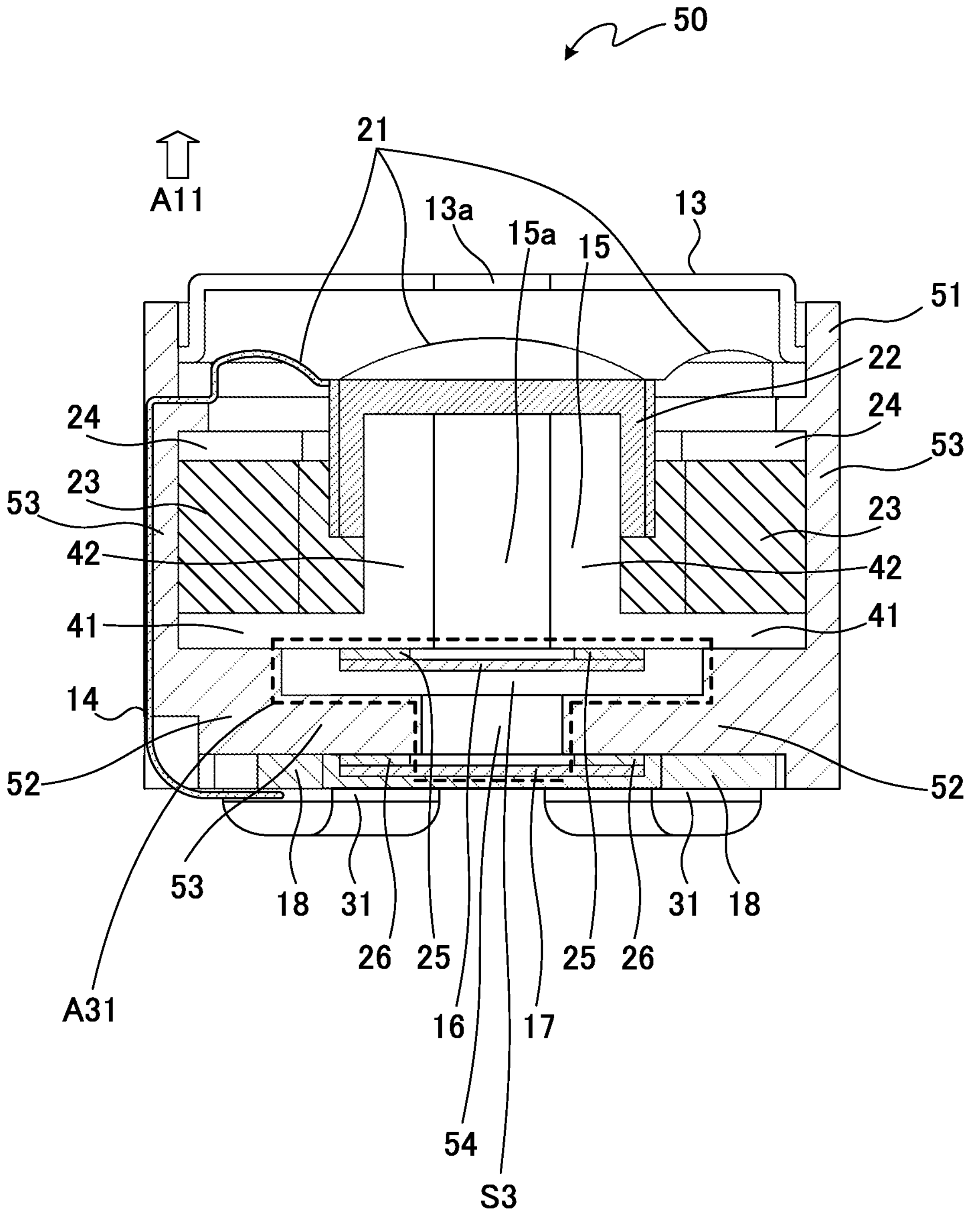
FIG. 8 is a cross-sectional view of a speaker unit according to Embodiment 2.

FIG. 8 is a cross-sectional view of speaker unit 50 according to Embodiment 2. In FIG. 8, the same components as those in FIG. 7 are denoted by the same reference numerals. As shown in FIG. 8, speaker unit 50 has frame 51.

Frame 51 has a recess shape. Frame 51 includes bottom 52 which has a disc shape and forms a recess-shaped bottom and side portion 53 which has a cylindrical shape and extends toward the front side of speaker unit 50 (in the direction of diaphragm 21) from bottom 52. The central portion of bottom 52 is recessed in a circular shape, having a hole 54 at the center recessed in a circular shape.

The diameter of the central portion recessed in a circular shape of bottom 52 is smaller than the diameter of bottom 41 of yoke 15 but larger than the diameter of hole 15*a* of yoke 15. This allows bottom 41 of yoke 15 and the recessed central portion of bottom 52 of frame 51 to form space S3 when yoke 15 is inserted into frame 51 (e.g., see dotted frame A31 in FIG. 8).

Resistance member 16 is bonded to bottom 41 of yoke 15 by adhesive member 25 before yoke 15 is inserted into frame 51. Then, yoke 15 with resistance member 16 is inserted into the inside of frame 51.

Board 18 is fixed to a surface of bottom 52 of frame 51, the surface on the side opposite to diaphragm 21.

As described above, frame 51 may be formed with a single member. Thus, speaker unit 50 needs less parts, which leads to a cost reduction.

Note that bottom 41 of yoke 15 and bottom 52 of frame 51 serve as partitions to form space S3 inside frame 51. Bottom 41 of yoke 15 may be referred to as "a first partition." Bottom 52 of the frame 51 may be referred to as "a second partition."

Embodiment 3

The direction of a diaphragm is reversed in Embodiment 3. In FIG. 7, a surface (front surface) of diaphragm 21 where coil 22 is not attached is directed to the side of sound conduit 2*a*, but according to Embodiment 3, the front surface of diaphragm 21 is directed to the side opposite to sound conduit 2*a*.

Figure 9:
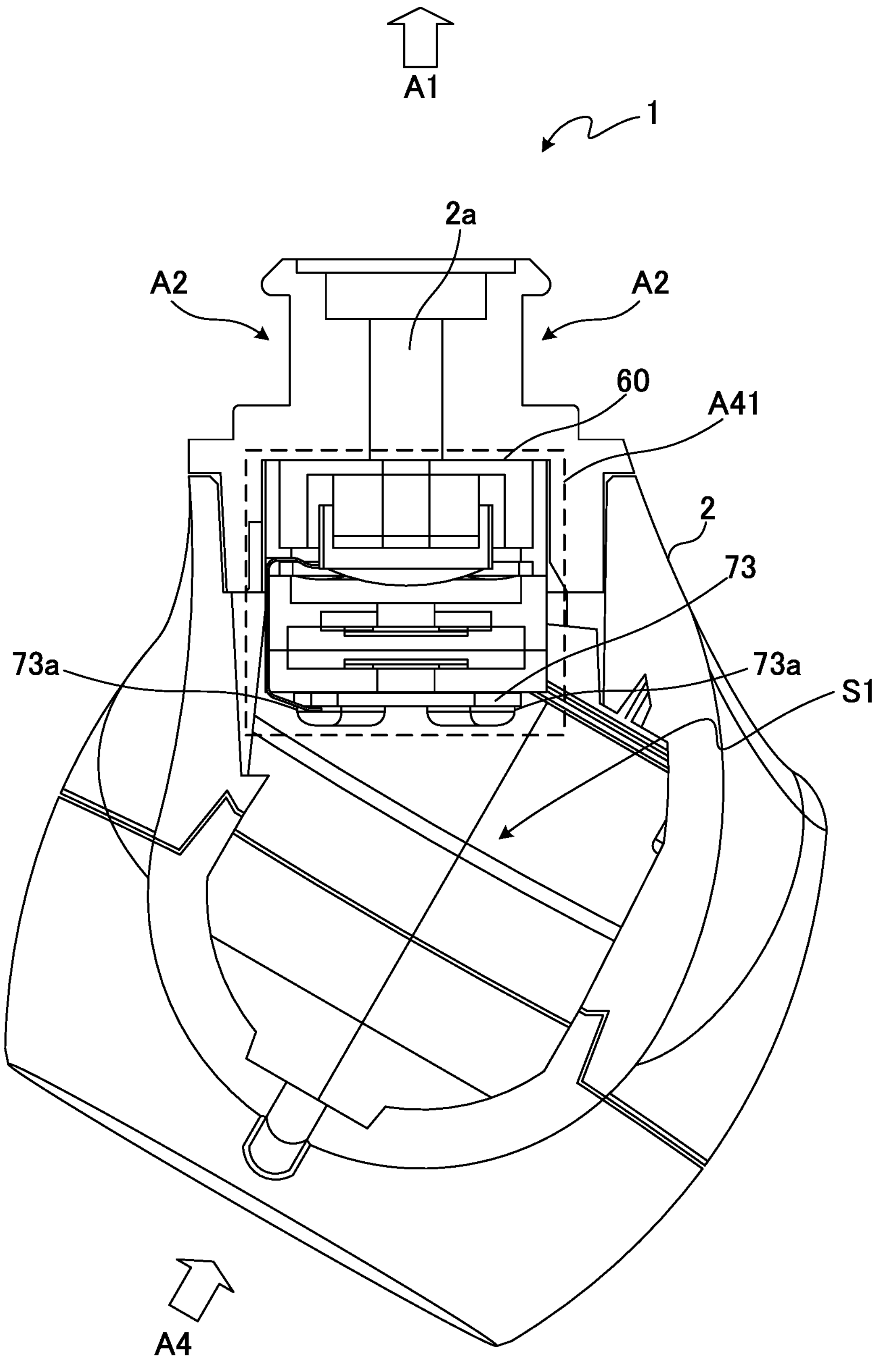
FIG. 9 is a partial cross-sectional view of an earphone provided with a speaker unit according to Embodiment 3.

FIG. 9 is a partial cross-sectional view of earphone 1 provided with speaker unit 60 according to Embodiment 3. In FIG. 9, the same components as those in FIG. 1 are denoted by the same reference numerals. A part surrounded by the dotted frame A41 shown in FIG. 9 is speaker unit 60. Speaker unit 60 has board 73. Board 73 has land 73*a* (see land 73*a* in FIG. 10).

Figure 10:
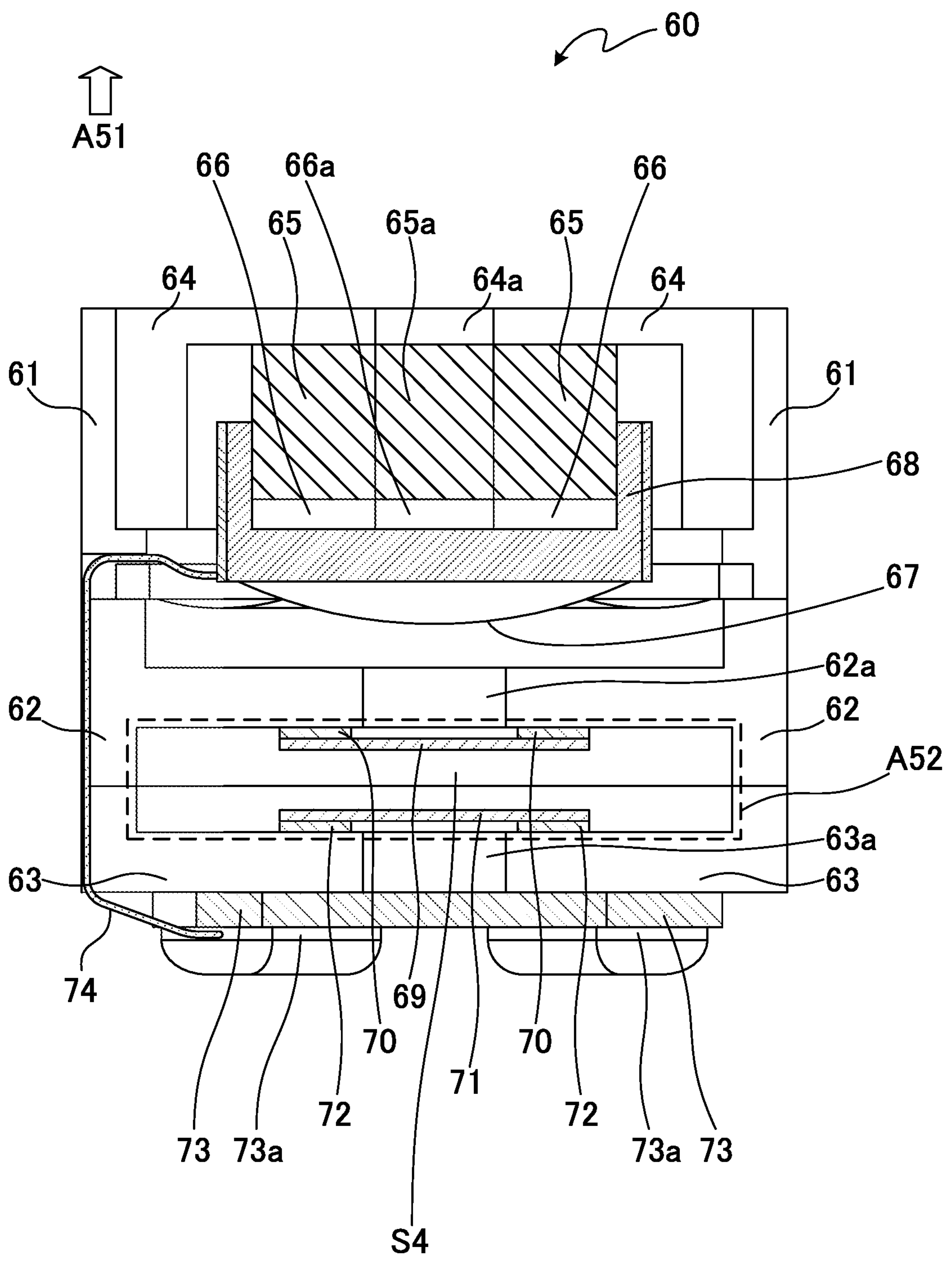
FIG. 10 is a cross-sectional view of the speaker unit.

FIG. 10 is a cross-sectional view of speaker unit 60. As shown in FIG. 10, speaker unit 60 includes frames 61, 62 and 63, yoke 64, magnet 65, pole piece 66, diaphragm 67, coil 68, resistance members 69 and 71, adhesive members 70 and 72, board 73, and wiring line 74. The direction indicated by arrow A51 in FIG. 10 is the front side of speaker unit 60 (the side of sound conduit 2*a* of earphone 1).

Frame 61 has a cylindrical shape. Frame 62 has a cylindrical shape and has a partition within the central portion. Frame 62 has hole 62*a* in the central portion of the partition. Frame 62 is under frame 61 on the rear side of speaker unit 60 (the side opposite to arrow A51 in FIG. 10).

Frame 63 has a recess shape and has hole 63*a* in the center of the bottom. Frame 63 is disposed to (under frame 62 on the rear side of speaker unit 60) frame 62 at the rear side of speaker unit 60.

Yoke 64 has a recess shape and has hole 64*a* in the central portion of the bottom.

Magnet 65 has a cylindrical shape. Magnet 65 has hole 65*a* in the central portion.

Pole piece 66 is a disk-shaped member and has hole 66*a* in the central portion.

Magnet 65 is accommodated within a recessed portion of yoke 64. Pole piece 66 is placed on the surface of magnet 65 on the side opposite to bottom of yoke 64. Hole 64*a* of yoke 64, hole 65*a* of magnet 65, and hole 66*a* of pole piece 66 communicate with each other, thus, forming a single hole communicating with sound conduit 2*a*.

Diaphragm 67 has a circular shape and the edge is fixed inside frame 61. Diaphragm 67 is placed between pole piece 66 and the partition of frame 62.

Coil 68 has a cylindrical shape. Coil 68 is fixed to the surface of vibration plate 67 on the rear side (the surface opposite to arrow A51).

The inner diameter of coil 68 is larger than the outer diameter of magnet 65 and the outer diameter of pole piece 66. The outer diameter of coil 68 is smaller than the diameter of the recessed portion of yoke 64. Coil 68 is placed so as to cover magnet 65 and pole piece 66, and is placed in the gap between yoke 64 and magnet 65.

Wiring line 74 is drawn from coil 68. Wiring line 74 drawn from coil 68 passes through the outer periphery of frame 62 and 63, and is soldered to land 73*a* of board 73.

Resistance members 69 and 71 are mesh-shaped or porous plate-shaped members. Resistance members 69 and 71 may be made of a nonwoven fabric of a chemical fiber. Resistance members 69 and 71 brake (suppress) the vibration of the sound transmitted from hole 62*a* of frame 62.

Resistance member 69 is bonded to frame 62 so as to close hole 62*a* of frame 62. Resistance member 69 is bonded to the surface of frame 62 on the rear side of speaker unit 60 by adhesive member 70. Adhesive member 70 has a hole at the center thereof so as not to block hole 62*a* of frame 62. Adhesive member 70 is a double-sided tape, for example.

Resistance member 71 is bonded with frame 63 so as to close hole 63*a* of frame 63. Resistance member 71 is bonded to the surface of frame 63 on the front side of speaker unit 60 by adhesive member 72. Adhesive member 72 has a hole at the center thereof so as not to block hole 63*a* of frame 63. Adhesive member 72 is a double-sided tape, for example.

Board 73 has a hole in the central portion thereof. The diameter of the hole of board 73 is larger than the diameter of hole 63*a* of frame 63. Board 73 is bonded with frame 63 so that the hole of board 73 does not overlap hole 63*a* of frame 63. Board 73 may be bonded with frame 63 by a double-sided tape or an adhesive, for example. Wiring lines 74 extending from coil 68 are soldered to lands 73*a* of board 73.

Speaker unit 60 has space S4 formed by frames 62 and 63 (e.g., see dotted frame A52 in FIG. 10). For example, speaker unit 60 forms space S4 by the partition inside frame 62 having a cylindrical shape and the bottom of frame 63 having a recess shape.

Space S4 communicates with diaphragm 67 through resistance member 69 and hole 62*a* of frame 62. Further, space S4 communicates with the outside of speaker unit 60 through resistance member 71. The volume of space S4 and the characteristics of resistance members 69 and 71 (e.g., how well air or sound passes therethrough) control the frequency characteristic of the sound pressure that determines the sound quality of the sound emitted from diaphragm 67.

Diaphragm 67 and board 73 are placed along the central axis of frame 11 to 63 having cylindrical shapes to interpose space S4 therebetween. Thus, board 18 is not placed inside space S4 for adjusting sound quality in speaker unit 60. Wiring line 74 connecting coil 68 with board 73 can also be placed outside space S4; therefore, speaker unit 60 and earphone 1 incorporating speaker unit 60 can reduce variations in sound quality.

As described above, speaker unit 60 incorporated in the housing of earphone 1 includes frames 61 to 63 having cylindrical shapes, diaphragm 67 emitting sound, and board 73 to which a wiring line of coil 68 provided to diaphragm 67 is connected. Inside frames 61 to 63, space S4 for adjusting sound quality of sound is formed, and diaphragm 67 and board 73 are placed inside frames 61 to 63 with space S4 interposed therebetween. The surface of diaphragm 67 opposite to the side where coil 68 is provided is directed to the side opposite to sound conduit 2*a* of earphone 1.

Thus, each speaker unit 60 can have a constant volume of space S4 for adjusting sound quality even when the front surface of diaphragm 21 faces the opposite side to sound conduit 2*a*, and thus can reduce variations in sound quality. Further, earphone 1 incorporating speaker unit 60 can also reduce variations in sound quality.

Note that the partition formed inside frame 62 having a cylindrical shape and the bottom of frame 63 having a recess shape serve as the partitions that form space S4 inside speaker unit 63.

(Variation 1)

Resistance member 69 is bonded with the surface of the partition formed inside frame 62 on the opposite side to arrow A51, but is not limited thereto. Resistance member 69 may be bonded to the surface of the partition formed inside frame 62 on the side of arrow A51.

Resistance member 71 is bonded with the surface of the bottom of frame 63 having a concave shape, on the side opposite to arrow A51, but is not limited thereto. Resistance member 71 may be bonded to the surface of the bottom of frame 63 having a concave shape, on the side in the direction of arrow A51.

(Variation 2)

The shapes and arrangements of yoke 64 and magnet 65 are not limited to the above. For example, a yoke having a protruding shape may be placed inside coil 68. Also, a magnet having a cylindrical shape may be placed outside coil 22.

In the above-described embodiments, the term "part" or "portion" used for the name of a component may be replaced with another term such as "assembly", "device", "unit", or "module".

The description has been given of embodiments with reference to the drawings, but the present disclosure is not limited to the examples. It is apparent that variations or modifications in the category described in the claims may be conceived of by a person skilled in the art. It is to be understood that such variations or modifications fall within the technical scope of the present disclosure. In addition, component elements in the embodiment may be optionally combined without departure from the spirit of the present disclosure.

INDUSTRIAL APPLICABILITY

The speaker unit according to the present disclosure is incorporated in a housing of an earphone and can be used for a sound reproduction of a music reproducer or an electronic device, such as a hearing aid.

REFERENCE SIGNS LIST

- 1 Earphone
- 2 Housing
- 2*a* Sound conduit
- 3, 50, 60 Speaker unit
- 11, 12, 51, 61, 62, 63 Frame
- 11*a*, 12*a* Cutout portion
- 12*b*, 15*a*, 54 Hole
- 13 Cover
- 14, 74 Wiring line
- 15, 64 Yoke
- 16, 17, 69, 71 Resistance member
- 18, 73 Board
- 21, 67 Diaphragm
- 22, 68 Coil
- 23, 65 Magnet
- 24, 66 Pole piece
- 25, 26, 70, 72 Adhesive member
- 31 Land
- 41, 43, 52 Bottom
- 42, 44, 53 Side portion
- S1, S2, S3, S4 Space

The invention claimed is:

1. A speaker unit incorporated in a housing of an earphone, the speaker unit comprising:

a frame having a cylindrical shape and a linear cutout portion on a circumferential outer surface;

a diaphragm emitting sound; and a board to which a wiring line of a coil provided to the diaphragm is connected, wherein the frame has a space inside, the diaphragm and the board are placed inside the frame with the space interposed between the diaphragm and the board, the wiring line is connected to the board through the linear cutout portion, the frame includes a first partition and a second partition inside the frame to form the space, the first partition includes a first hole extending to the diaphragm, the second partition includes a second hole communicating with an outside of the speaker unit, the first hole is closed by a first resistance member, and the second hole is closed by a second resistance member.

2. The speaker unit according to claim 1, wherein the frame includes a first frame and a second frame, the first partition is formed in the first frame, the second partition is formed in the second frame, and the board is fixed to the second partition.

3. The speaker unit according to claim 1, wherein the frame is formed with one member.

4. The speaker unit according to claim 1, wherein the diaphragm includes a surface on a side opposite to a side where the coil is provided, the surface being directed to a side opposite to a side of a sound conduit formed in the earphone.

5. The speaker unit according to claim 4, wherein the frame includes a first frame and a second frame, the first partition is formed in the first frame, the second partition is formed in the second frame, and the board is fixed to the second partition.

6. The speaker unit according to claim 4, wherein the frame is formed with one member.

7. The speaker unit according to claim 1, wherein the second resistance member is placed on a surface of the second partition, the surface being on a side opposite to the diaphragm.

8. The speaker unit according to claim 1, wherein the first resistance member is bonded to the first partition.

9. An earphone, comprising:

a housing; and a speaker unit incorporated in the housing, wherein the speaker unit includes:

a frame having a cylindrical shape and a linear cutout portion on a circumferential outer surface;

a diaphragm emitting sound; and a board to which a wiring line of a coil provided to the diaphragm is connected, wherein the frame has a space inside, the diaphragm and the board are placed inside the frame with the space interposed between the diaphragm and the board, and the wiring line is connected to the board through the linear cutout portion, the frame includes a first partition and a second partition inside the frame to form the space, the first partition includes a first hole extending to the diaphragm, the second partition includes a second hole communicating with an outside of the speaker unit, the first hole is closed by a first resistance member, and the second hole is closed by a second resistance member.

10. The earphone according to claim 9, wherein the second resistance member is placed on a surface of the second partition, the surface being on a side opposite to the diaphragm.

* * * * *